Dec. 17, 1957  L. W. ROBBINS ET AL  2,816,489
SINE PLATE
Filed April 15, 1955  2 Sheets-Sheet 1
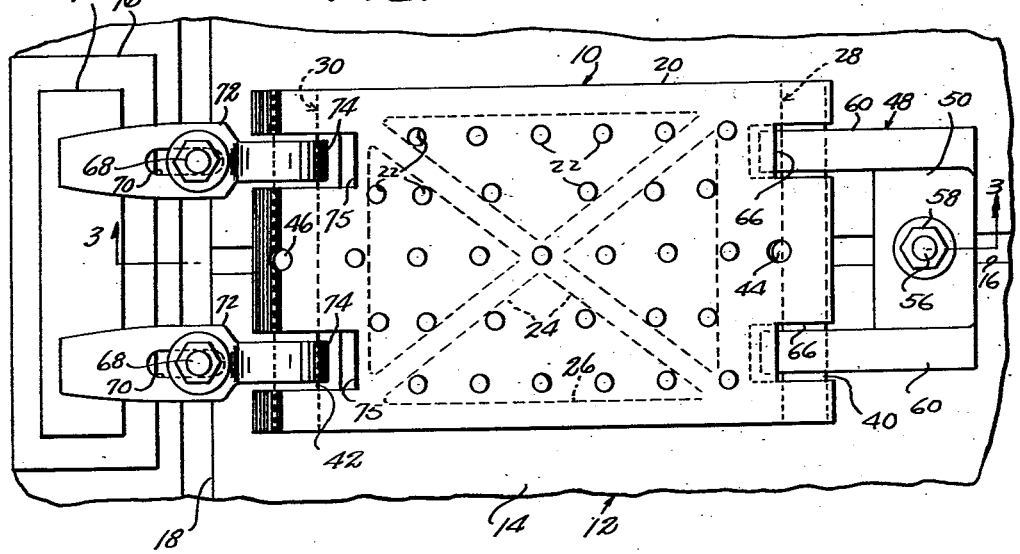
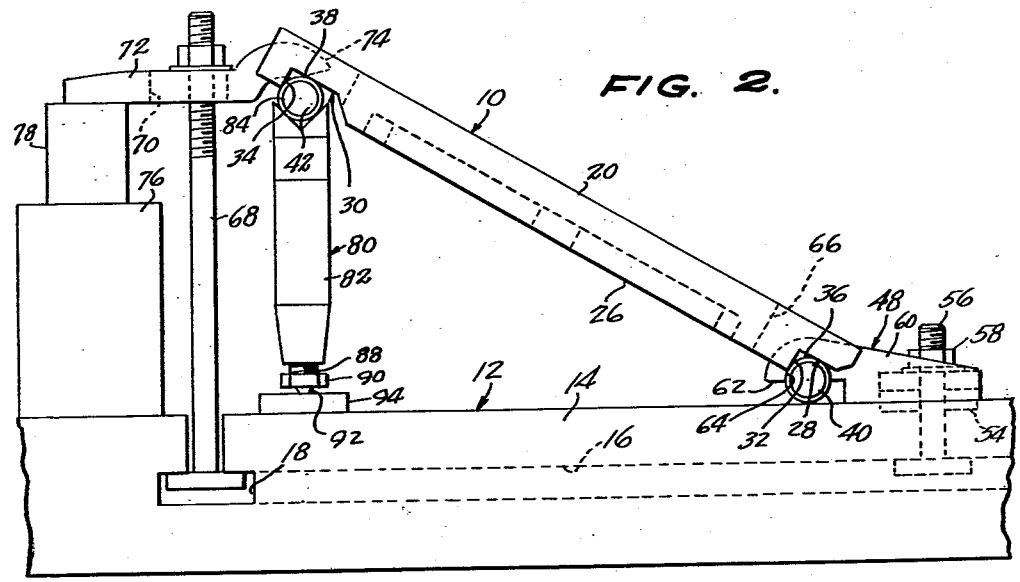
INVENTORS
ALONZO P. SMITH,
LLOYD W. ROBBINS,
BY
McMorrow, Berman + Davidson
ATTORNEYS.

Dec. 17, 1957 L. W. ROBBINS ET AL 2,816,489
SINE PLATE
Filed April 15, 1955 2 Sheets-Sheet 2

INVENTORS
ALONZO P. SMITH,
LLOYD W. ROBBINS,
BY
McMorrow, Berman & Davidson
ATTORNEYS

United States Patent Office 2,816,489
Patented Dec. 17, 1957

2,816,489

SINE PLATE

Lloyd W. Robbins, Redondo Beach, and Alonzo P. Smith, Hawthorne, Calif., assignors to Denco Machine Products, Hawthorne, Calif., a firm Application April 15, 1955, Serial No. 501,496

1 Claim. (Cl. 90—59)

This invention relates to sine plates, and more particularly to a sine plate adapted for rugged use on milling machines, shapers, jig boring machines, and the like.

Summarized briefly, the invention comprises a sine plate, having a clamping device on one bar thereof adapted to be clamped directly to the table of the machine tool, a set of adjustable jacks under the other bar of the plate for raising and lowering the same to obtain the desired angle of the plate, and a set of clamps for clamping the raised end of the plate solidly, so that heavy cuts may be taken on a work piece fastened to the sine plate, or on a work piece held in a vise or other work-holding fixture attached to the plate.

Among the difficulties which have heretofore persisted in the art is that arising from providing a mounting and clamping means for a sine plate which, while permitting full adjustment of the plate to a selected angular position, and while also permitting clamping of the plate in the selected position, fails to maintain the plate, in the selected position thereof, with full rigidity. In many instances, rigidity of the sine plate is an absolute requirement, as distinguished from other instances, as for example when the sine plate is being used to position work for inspection or light grinding, where rigidity may not be required. An important object of the present invention, accordingly, is to provide a sine plate construction in which the clamp means will be so designed as to permit rigid clamping directly to the table of a machine tool. To this end, in accordance with the present invention, we expose through the upper surface of the plate the top surfaces of the support bars thereof, with the clamp means extending directly into the open spaces of the plate into clamping engagement with the bars, so as to force said bars directly downwardly into firm engagement with either the table itself, or support means resting directly upon said table.

Another object of importance, to insure precise positioning of the sine plate, is to provide means embodied directly in the base clamp of the device that will automatically, when the base clamp is engaged against the associated base bar of the sine plate, position the bar, with its length accurately disposed normally to the length of the table.

Yet another object is to provide a sine plate so designed as to facilitate the swift adjustment of the plate to a selected angular position, and the swift clamping of the plate in the selected position, thus to provide savings in time with an attendant reduction in the overall cost of the operation being performed.

Yet another object of importance is to provide a sine plate which will be so designed as to permit manufacture of the plate at a relatively low cost, despite the particular advantages previously noted herein as compared to other plates of generally similar construction. With further reference to this object, a common expedient in sine plate manufacture is to employ precision hinge or pivot bearings, but these have been found to impart a noticeable lack of rigidity to the sine plate, and in accordance with the present invention, bearings of this type are wholly eliminated.

Yet another object is to provide a sine plate for use on machine tools that does not require that precision gauge blocks be left in position during the actual machining operations.

Other objects and advantages will appear from the following description, the claim appended thereto, and from the annexed drawings in which like reference characters designate like parts throughout the several views and wherein:

Figure 1 is a top plan view of a sine plate formed according to the present invention, a machine tool table on which the plate is supported being illustrated fragmentarily;

Figure 2 is a side elevational view of the sine plate in which the table has again been shown fragmentarily;

Figure 3:
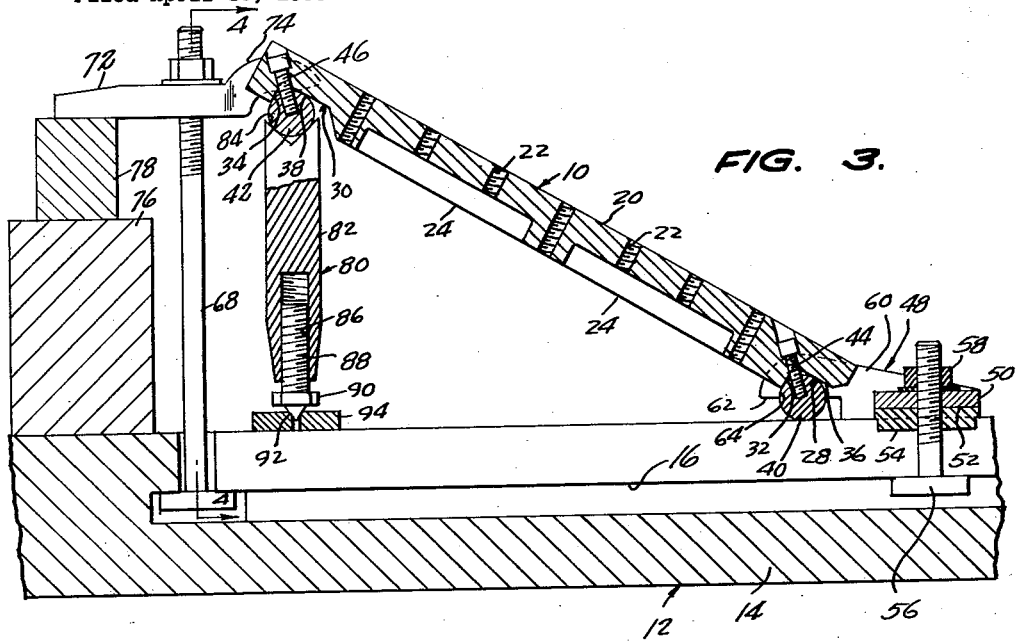
Figure 3 is a longitudinal sectional view substantially on line 3—3 of Figure 1.

The sine plate constituting the present invention has been generally designated at 10, and has been illustrated in an operative, angular position of adjustment upon a machine tool table 12. The table, as is usual, includes a plate-like body 14 having a flat top surface, and said body in the illustrated example has a longitudinal T-slot 16, intersecting at one end thereof with a transversely disposed T-slot 18 perpendicular to the length of the T-slot 16.

The table is wholly conventional and does not constitute part of the present invention. It will be understood that instead of the T-slot arrangement illustrated, the work table might have a plurality of longitudinal, parallel T-slots and no transverse slots, such a table being well known in the art and being as well adapted to the support of the sine plate as that shown.

The sine plate includes a plate-like body 20, having a substantially rectangular outer configuration, and formed with threaded openings 22 disposed in any of various arrangements, such as, for example, in transversely spaced, longitudinal rows, for the purpose of receiving bolts, not shown, supporting the work or a work holding fixture, also not shown, in fixed relationship to the plate body 20. The plate body may be reinforced through the provision of crossing ribs 24 on its underside, and through the further provision of a peripheral, depending flange 26 on the underside thereof, these being cast or otherwise formed integrally with the body portion 20 of the sine plate.

Formed in the underside of the sine plate, at opposite ends thereof, are transverse grooves generally designated 28, 30, opening at opposite ends upon the respective side surfaces of the plate. The grooves are formed with side walls 32, 34 respectively, said side walls being flat from side to side of the sine plate and lying in parallel planes perpendicular to the plane of the top surface of the body portion 20. The side walls 32, 34, both face in the same direction, that is, toward the base end of the plate, and are spaced apart accurately to a given dimension, such as twelve inches, fifteen inches, or twenty inches, depending upon the size of the device. The grooves also have inner or bottom walls 36, 38 respectively, also flat and disposed in a common plane paralleling the plane of the top surface of the body portion 20.

Extending fully from side to side of the body portion 20, within the respective grooves 28, 30, are solid bars 40, 42. These are circular in cross section, being preferably made of hardened steel. The bars are ground to identical diameters, so that the spacing between the center line or major axis of base bar 40 and that of upper bar 42 is identical to the distance between the side walls 32, 34 of their associated grooves.

The bars are fixedly mounted within the recesses, through the medium of bolts 44, 46, extending through openings formed in the body portion 20 and threadedly engaged in radial, bolt-receiving recesses formed in the respective bars 40, 42.

A base clamp has been generally designated at 48, and is, considering its general shape, approximately of U-shaped configuration, with the bight of the clamp being formed as a flat, rectangular plate member 50 extending transversely of body portion 20 a short distance beyond the base end thereof. Plate member 50 has, medially between its opposite ends, a transverse, downwardly opening groove 52 (Figure 3) receiving a key 54 which extends downwardly into T-slots 16, thus to insure that the plate 50 will extend perpendicularly to the length of the T-slot. A T-bolt 56, engaged in the T-slot 16, extends through aligned openings formed in the plate member 50 and key 54, and projects above the plate member 50, receiving a nut 58 which, when turned home against the plate member 50, fixedly secures the plate member to the table, in cooperation with the key 54, in the prescribed, exact position desired for the base clamp 48.

Integral with the plate member 50, at opposite ends thereof, are clamp arms 60, these projecting from the plate member 50 in the direction of the adjacent end of the body portion 20. The clamp arms 60, at their free ends, have angular receses 62 formed in their under surfaces, and in communication with said recesses are arcuate, transverse bores 64 formed in the respective arms 60 upon the same radius as the bar 40, to receive the respective end portions of the bar.

As shown in Figure 1, the body portion 20, at its base end, has transversely spaced end recesses or slots 66, substantially wider than the arms 60, the arms extending within said slots and overlying the respective bars, so that when the plate member 50 is secured to the work table, the arms 60 will bear downwardly upon the end portions of bar 40, to cooperate with the work table in securing the bar 40 firmly to the table.

It is important to note that through the provision of the key of member 50, the bar 40 is automatically disposed exactly perpendicularly to the length of the work table, when the clamp arms 60 are forced downwardly thereagainst.

Figure 4:
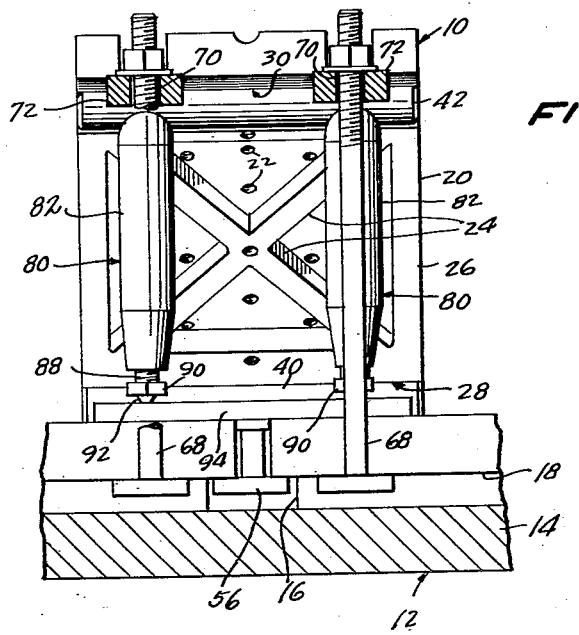
Figure 4 is a transverse sectional view substantially on line 4—4 of Figure 3.

Referring now to Figures 3 and 4, a clamp means is provided also for the bar 42 at the upper end of the body portion 20, and includes a pair of transversely spaced, identically formed, elongated T-bolts 68 the heads of which are engaged in the transverse slot 18. If the work table is one having a plurality of longitudinal slots and no transverse slots, the T-bolts would be engaged in longitudinal T-slots disposed adjacent the center slot 16 at opposite sides thereof.

Bolts 68, at their upper ends, project upwardly through closed, short, longitudinal slots 70 formed in a pair of transversely spaced, identically formed upper clamp arms 72, having upwardly offset forward ends 74 extending into upper end slots 75 formed in the body portion 20 of the sine plate. The upwardly offset ends 74 of arms 72 bear against the upper surface of the upper bar 42, adjacent the opposite ends of said bar.

At their other ends, the clamp arms 72 are supported upon superposed blocks 76, 78 resting upon the table.

To facilitate the adjustment of the body portion 20 to a selected angular position, there are provided transversely spaced, identically formed jacks generally designated at 80, disposed below the upper end of the body portion 20, adjacent the respective sides of said body portion. Each jack includes an elongated jack body 82 the lower end of which may be tapered as shown, the upper end of the jack body having a V groove 84 receiving the bar 42. The body, at its lower end, has an axial, downwardly opening, threaded socket 86 for an adjusting screw 88 having a hex or other non-circular head 90 to facilitate rotation thereof, and below head 90, the screw is formed with a conically tapered tip 92 engaging in a complementarily flared opening formed in a pad 94. Pad 94, as shown in Figure 4, is of elongated formation, so as to support both jacks, and preferably, the pad is bolted or otherwise fixedly secured to the work table to prevent sliding thereof.

In use of the device, the sine plate is set upon the machine tool table, being first placed upon the table at the desired location. The base plate 48 is then hooked into position over base bar 40, with this operation being facilitated by downward movement of the clamp arms 60 through the end slots 66 of the body portion 20. The key 54 engages in the T-slot 16, and the nut 58 is now turned home to a sufficient extent to insure the positioning of the bar 40 perpendicularly to the length of the slot 16, but not to such an extent as would prevent rotation of the base bar 40 within its associated groove 28. The sine of the desired angle of the body portion 20 is then determined and is multiplied by the distance between the center lines of bars 40, 42. A planer guage or a stack of gauge blocks, not shown, is then set to this dimension. The end of body portion 20 having bar 42, that is, the upper end thereof, is then elevated, causing the bar 40 to rotate within groove 28 until the gauge blocks can be inserted under the bar 42. Bar 42 is then permitted to rest upon the gauge blocks.

Jacks 80 are now brought into position and adjusted for height so that the V-notched upper ends thereof touch the bar 42, but do not lift the bar from the gauge blocks. The dogs or clamps 72 may now be tightened by means of the nuts on bolts 68, thereby securely clamping the body portion 20 at the desired angle.

The gauge blocks may now be removed from beneath the bar 42 and will no longer be needed during the machining operation. The nut 58 is now turned home to its maximum extent, to bring additional pressure on the clamp 48 and hence on the bar 40, securely clamping the bar 40 to the work table.

The assembly and adjustment of the device is now complete, and a vise or other work-holding fixture may now be bolted to top surface of body portion 20 through the provision of the several tapped holes or apertures 22 thereof.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A sine plate mountable on a work table, comprising: a flat plate-like body portion having a top surface adapted to support a work piece, said body portion having adjacent its ends parallel transverse grooves formed in its underside, said body portion having openings communicating between said grooves and the top surface, the body portion having longitudinal recesses spaced transversely of the same at each of its ends, said recesses communicating between the grooves, the top surface, and the adjacent end surfaces of the body portion; a pair of bars engaged in the respective grooves and having threaded radial recesses registered with said openings; screws extending through said openings and engaging in said recesses to fixedly, separably connect the bars to said body portion, said body portion being movable upwardly on the bars on disconnection from the bars; a base clamp at one end of the body portion adapted for attachment to said table and including transversely spaced clamp arms extending into the first recesses of one end of the body portion and being formed to widths less than those of the first recesses, said clamp arms being in overlying relation to one of said bars to hold the same in engagement with the work table, the clamp arms extending clear of the path of upward movement of the body portion so as to leave said one bar fixedly engaged against the work table when the body portion is disconnected, in position for re-connection of the body portion to said one bar without change of the previous position of the body portion in respect to the table; jack means adapted to be supported on the table and underlying the other bar in supporting relation thereto; and clamping means extending into the first recesses of the other end of the body portion and adapted for connection to the table, said clamping means being in overlying relation to the other bar for clamping the other bar to the jack means and being also clear of the path of the upward movement of the body portion so as to leave the other bar fixedly engaged with the jack means in position for reconnection of the body portion to the other bar without change of the previous position of the body portion in respect to the work table.

References Cited in the file of this patent
UNITED STATES PATENTS

| | | |
|---|---|---|
| 577,226 | Bly | Feb. 16, 1897 |
| 1,033,758 | Howell | July 23, 1912 |
| 1,323,059 | Hunter | Nov. 25, 1919 |
| 1,376,077 | Cadwallader | Apr. 26, 1921 |
| 1,551,995 | Lovenston | Sept. 1, 1925 |
| 2,645,026 | Trbojevich | July 14, 1953 |